No. 641,453. Patented Jan. 16, 1900.
R. M. HUNTER.
METHOD OF CONTROLLING ELECTRIC MOTORS.
(Application filed Nov. 9, 1899.)
(No Model.)
Fig. 1.
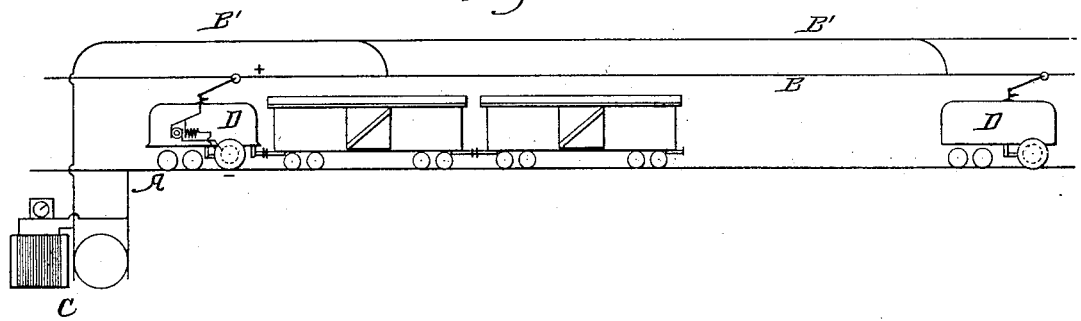
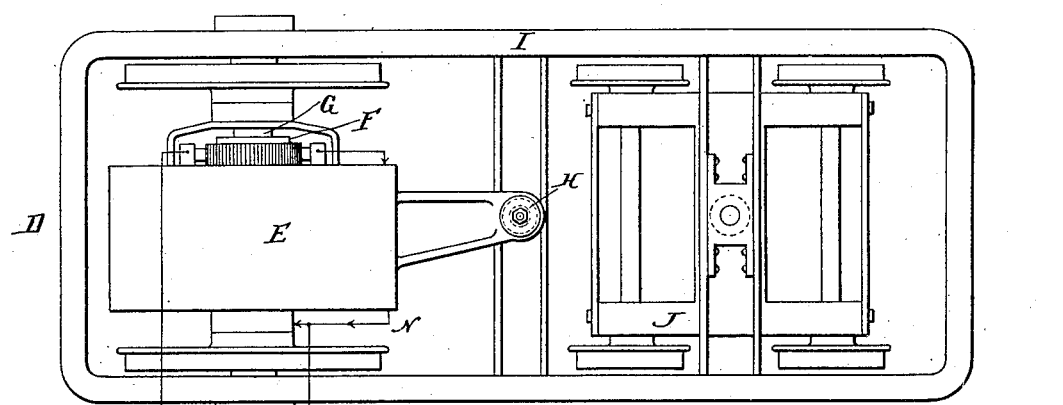
Fig. 2.
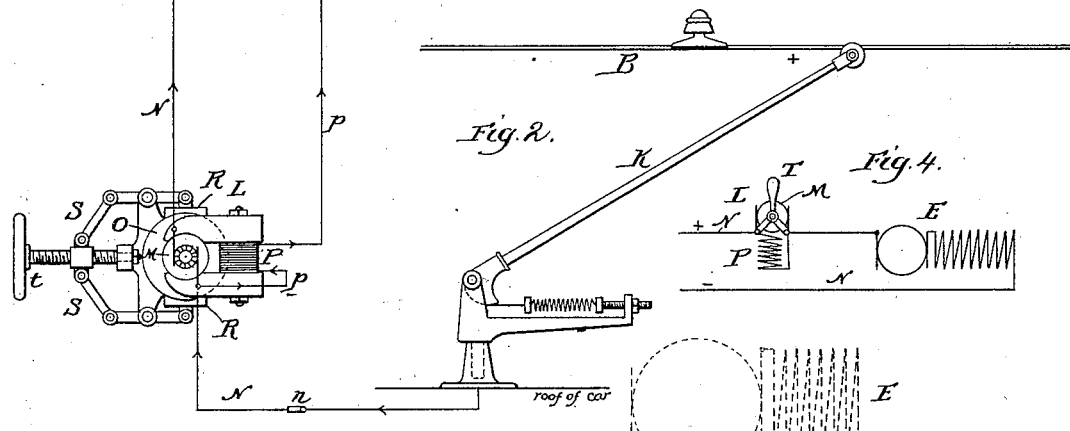
Fig. 3.
Fig. 4.
Witnesses:
H. B. Hallock
R. M. Kelly
Inventor.

UNITED STATES PATENT OFFICE.

RUDOLPH M. HUNTER, OF PHILADELPHIA, PENNSYLVANIA.

METHOD OF CONTROLLING ELECTRIC MOTORS.

SPECIFICATION forming part of Letters Patent No. 641,453, dated January 16, 1900.

Original application filed January 16, 1894, Serial No. 497,024. Divided and this application filed November 9, 1899. Serial No. 736,304. (No model.)

*To all whom it may concern:*

Be it known that I, RUDOLPH M. HUNTER, of the city and county of Philadelphia and State of Pennsylvania, have invented an Improvement in Methods of and Means for Controlling Electric Motors, of which the following is a specification.

My invention has reference to a method for controlling electric motors; and it consists of certain improvements, which are fully set forth in the following specification and shown in the accompanying drawings, which form a part thereof.

This application (Case No. 311) is a division of my application, Serial No. 497,024, filed January 16, 1894, and comprehends a certain improved method for regulating the speed and power of electric motors without the employment of resistance-rheostats.

My improvements are especially adapted to electric traction, where the duty put upon the motor is most varied and severe. In cases where two motors have been employed to propel the same car I have found it convenient and excellent in practice to couple the said motors in series or parallel to vary the counter electromotive force of the said motors, and thereby regulate the same when working upon a constant-potential circuit. That system is more or less impracticable where a single motor is employed for obvious reasons, and my present improvement is to provide a means also operating to oppose to the initial electromotive force by a counter electromotive force to control the flow of current through the motor or motors, and thereby vary the speed and power of the said motor or motors to a far greater nicety.

My invention is peculiarly applicable to a case where a single large motor is to be regulated, but may also be used where two or more motors are employed; but in that case the said several motors would preferably be connected permanently in series or multiple.

In carrying out my invention I provide the electrically-propelled vehicle with a small regulator-motor having no work to perform and so constructed that an exceedingly high velocity is possible. The armature of the said regulator-motor I connect in series with the large motor or motors, so that the current from the source of electrical energy is first caused to pass through the armature of the regulator and then through the power motor or motors, whereby whatever current passes through the power-motors is required to pass through the armature of the regulator. The armature of the regulator revolves freely within a field, preferably of fixed intensity, so that the regulator generates a counter electromotive force which is opposed to the initial electromotive force of the line. To regulate the power motor or motors, the speed of the regulator-armature is varied, being increased or decreased by a suitable hand-controller. I have found in practice with this system that the large series power-motor could be readily brought to rest or may run at any desired speed by the simplest adjustment of the speed of the regulating-armature. I have employed braking devices to control the said speed and also adjustment by means of the brushes causing their position upon the commutator relatively to the field-poles to be shifted. This latter method is perhaps the simplest and best in actual practice.

My invention will be better understood by reference to the accompanying drawings, in which—

Figure 1 is a side elevation illustrating diagrammatically an electric railway embodying my invention. Fig. 2 is a plan diagrammatic view showing the relative connections of the various parts of my improvements. Fig. 3 is an elevation of another form of my apparatus, and Fig. 4 is a diagram illustrating a modification of the construction shown in Fig. 3.

A are the rails and may act as the return-conductors. B is the outgoing or positive conductor, and B' are the feeding conductors or wires leading to the positive conductor B at different distances from the generating-station. C is a constant-potential generator, having a regulator c to control the field. This system of circuits will deliver constant-potential currents to the line. The conductor B may be a suspended conductor carried by insulators b, as is customary in trolley systems.

D is an electric locomotive or car. This vehicle is provided with a frame I, which may have at one end a pivoted truck J, and a rear axle G, directly driven by an armature F of a large series motor E, which is journaled upon or concentric with the axle G and supported by the frame I at H in any convenient manner.

I do not confine myself to any particular construction of vehicle or method of connecting the motor or motors thereon with the axle or axles, as my invention is applicable to any of the constructions heretofore employed. The vehicle is provided with a current-collecting device K, which is shown as an ordinary trolley, preferably arranged upon the roof of the car and making an underrunning contact with the suspended conductor B'. A large number of cars would ordinarily be employed in parallel on the line.

N is the motor-circuit leading from the trolley to the motor or motors E and then connecting with the wheels, so that the current returns by the rails A to the generator C.

L is the regulator-motor, and consists of a small armature M, having a winding capable of carrying the current required for the motor or motors E and connected in the motor-circuit N in series with the motor or motors E. This armature M is perfectly free to revolve, as it performs no work except as a generator of counter electromotive force. It revolves in a field produced by the field-magnets P, which are preferably arranged in a shunt-circuit $p$ about the motor or motors E and the armature M of the regulator, so that the field remains substantially constant. The armature-shaft M may be provided with a brake-wheel O, upon which the brake-shoes R may be pressed by toggles S, and a hand-screw $r$ to vary or control speed of rotation of the armature M. If the brake-shoes are removed, the speed of the motor M increases until its counter electromotive force equals the initial electromotive force of the line and the regulator-motor is working at its greatest efficiency. If the hand-screw R is operated to lower the speed of the armature M, a current is instantly permitted to flow through the motor-circuit N and motor or motors E, and this may be increased as desired, allowing the motor or motors E to gradually accelerate its or their speed. The reverse operation may be performed in stopping the motor or motors E. A suitable cut-out switch may be inserted in the motor-circuit on the car for permanently or for a longer or shorter period interrupting the circuit and would be used when the car is absolutely kept at rest. Such a switch is shown at $n$ in the motor-circuit N on Fig. 2. Ordinarily it would be interposed between the trolley K and regulating counter-electromotive-force generator L.

The counter electromotive force of the regulator-armature M and the motor E permit the most perfect and gradual regulation without endangering the armatures of either the motor E or regulator L by too long simultaneous inaction. By the proper construction of the regulator L but a very low resistance is required in the armature M, and hence this regulator may be made exceedingly small.

In the construction shown in Fig. 3 we have the same general construction as in Fig. 2; but in this case there is no brake to vary the speed of the armature, but instead the brushes of the armature are controlled by a hand-lever T, which upon being moved will control to an absolute nicety the counter electromotive force in the regulator-motor, causing the armature E of the regulator to vary its speed from a state of rest to maximum and to permit the changes to be made with the most gradual accuracy. In this figure I have shown a second motor E. (Indicated in dotted lines in parallel with the regulating-armature M.) This is the preferred arrangement when two motors E are employed, though it is also evident that such motors E may be maintained permanently in series with each other if their resistance is not too great.

I have shown a resistance Q in the shunt-circuit $p$ of the field-magnets P; but this need not necessarily be employed, as the field-magnets should be of sufficiently high resistance to permit them being permanently connected with the line-circuit. I have not shown in the drawings the usual reversing-switches employed with the power-motors E, as they may be employed in the manner customary with all series electric motors requiring the current to be reversed in either the armature or field.

In Fig. 4 we have the same construction as that of Fig. 3 except that the field-coil of the controller L is in shunt about the regulator-armature M, but in series with the power-motor E. It is also evident that in place of shifting the brushes by handle T the speed of this motor may be regulated by the brake shown in Fig. 2, or, if desired, the field-coil P of the regulator-motor L of Fig. 2 may be put in the relation shown in Fig. 4.

I do not limit myself to any particular construction of regulating-motor L, as it may be constructed in any manner desired. It is evident that the field may be produced by permanent magnets, though this is not desirable. It is also evident that the regulator-motor may be a series motor in place of a shunt-motor; but I do not claim this specific construction in this application, as that will form subject-matter of another application. My invention comprehends, broadly, the regulation of one or more motors by means of a counter-electromotive-force generator having conductors moving within a field and in which the speed of the moving conductor is varied by means of hand operated or controlled devices to vary the counter electromotive force in the regulating-motor.

Any of the sources of electricity heretofore well known may be used to supply electricity to the motors—such, for example, as storage batteries as well as dynamos—as, broadly considered, the particular source of energy is immaterial.

In this application I do not claim the apparatus for controlling motors by counter-electromotive-force system of regulation, as the apparatus forms subject-matter of the parent application, Serial No. 497,024, filed January 16, 1894.

Having now described my invention, what I claim as new, and desire to secure by Letters Patent, is—

1. The herein-described method of varying the speed of electric motors during their normal maximum work, which consists in supplying to the motor a current of constant potential, producing by magnetic induction in the circuit wholly exterior to the motor while in the performance of its normal duty and between the source of supply and motor a gradual varying magnetically-induced counter electromotive force variable independently of and in advance of the speed of the motor and current flowing through it during the performance of its maximum work, maintaining said counter electromotive force, and more or less opposing the said current of constant potential by varying by hand regulation the magnetically-induced counter electromotive force by weakening or strengthening the inductive influence of the circuits in which the counter electromotive force is generated during and inversely with the corresponding inductive influence required in the motor or motors during the performance of their normal duty.

2. The herein-described method of varying the speed of electric motors during the performance of their normal work, which consists in supplying to the motor a current of constant potential, producing by magnetic induction in the circuit between the source of supply and motor an induced counter electromotive force independent of and inversely to the counter electromotive force and speed of the motor, maintaining and opposing to the said current of constant potential the magnetically-induced counter electromotive force during the period of the power-motor performing its normal duty, and increasing and decreasing the magnetically-induced regulating counter electromotive force without interrupting it by hand regulation in advance of the required changes in the speed and counter electromotive force of the motor.

3. The herein-described method of positively varying the speed of electric motors while performing their maximum work, which consists in supplying to the motor an electric current of constant potential, opposing the said current between the source of supply and motor by an induced counter electromotive force set up by two relatively movable parts capable of producing inductive effects one upon the other, and gradually increasing or decreasing without interrupting the inductive effects in the circuit exterior to the motor inversely with the counter electromotive force required in the motor during the performance of its maximum work to vary the regulating counter electromotive force produced by said relatively movable parts independently of and in advance of the changes in the speed of the motor or current in the line to vary the speed and power of the electric motor at will during its continuous running operation.

4. The herein-described method of regulating the speed of an electric power-motor consisting of supplying a current of constant potential to the armature and field of the motor in series, causing the current to divide and part to flow through and energize a regulating revolving electromagnetic element in series with the armature and field of the power-motor and part through an electromagnetic field electrically independent of the power-motor and in the vicinity of the revolving electromagnetic element for maintaining a magnetic field around the said regulating revolving electromagnetic element unaffected by the field of the motor, and varying the speed of rotation of the revolving electromagnetic element independently of and in advance of the changes in speed of the power motor or current in the motor-circuit to vary the induced counter electromotive force thereof.

5. The herein-described method of regulating an electric motor consisting in passing a current of electricity successively through the revolving elements of two motors, maintaining a magnetic field in the vicinity of the revolving element of one of the motors, and shifting the poles of the said revolving element relatively to the poles of the magnetic field of the last-mentioned motor by hand in advance of desired changes in speed of the motor to be regulated whereby its induced counter electromotive force is varied and opposed to the initial electromotive force of the operating-current of electricity to vary the speed of the other motor and in which the counter electromotive forces of the two motors vary inversely.

6. The herein-described method of regulating electric motors consisting in causing a current of electricity to flow successively or in series through the revolving elements of a high-speed motor and a low-speed motor, and shifting the magnetic poles of the revolving element of the high-speed motor relatively to the field-poles thereof to vary the counter electromotive force of the revolving element in advance of desired changes in speed of the low-speed motor for the purpose of controlling the current delivered to the low-speed motor.

7. The herein-described method of operating an electric railway and controlling the movement of cars thereon, consisting in supplying current of constant potential to conductors extending along the railway, delivering current from said conductors to motors upon a series of independently-movable cars for propelling said cars, maintaining a movable connection between the conductors and the motors during the travel of the cars, separately controlling the current passing through the motors of the respective cars by causing the current on each car to pass successively through the revolving elements of the motor and a counter-electromotive-force-generating regulator for the purpose of opposing the current from line-conductors by a counter electromotive force independent of the motors, and independently of and in advance of changes of the speed of the power-motor varying the speed of the revolving element of the counter-electromotive-force-generating regulator by hand control to vary the counter electromotive force opposed to the current supplied to the motor, whereby the various cars may be made to move at different speeds, while being maintained in parallel and receiving current from a single source of supply of constant potential.

8. The herein-described method of regulating the speed of an electric motor while performing its normal duty, consisting in continuously passing a current of electricity successively through the revolving elements of two separate motors each having a magnetic field one of which is loaded and the other revolving freely, and positively varying the counter electromotive force of the revolving element of the motor revolving freely independently of the counter electromotive force or variations in speed of the other or loaded motor at a time when it is performing its maximum duty, whereby the current supplied to the latter motor is either positively increased or decreased without being interrupted.

9. The herein-described method of regulating the speed of an electric motor while performing its normal duty, consisting in continuously passing a current of electricity successively through the revolving elements of two separate and distinct motors each having a magnetic field and in which one of said motors is loaded and the other unloaded, and increasing and decreasing the speed of the revolving element of the unloaded motor (in advance of and) independently of the speed of the loaded motor for the purpose of producing a variable counter electromotive force in advance of changes in speed of the loaded motor to continuously oppose to a greater or less extent the initial electromotive force of the current supplied to the motor having the loaded revolving element while performing its normal duty, whereby the latter is made to increase or decrease its speed.

10. The herein-described method of controlling the speed of an electric motor while performing its normal duty, which consists in operating an electric motor and producing a counter electromotive force therein by passing a current of electricity in a circuit through it, generating by self-induction a variable counter electromotive force in the said circuit intermediate of the source of energy and the electric motor during the time the motor is performing its normal duty, and varying the self-induction during the normal running of the motor in advance of and inversely to the decrease or increase of the counter electromotive force and speed of the motor required.

11. The method of regulating a continuously-flowing current to a translating device capable of producing a counter electromotive force from nothing to a maximum, consisting in supplying a current of constant potential to a translating device having the above qualities, producing by the current intermediate of its source and the translating device a counter electromotive force by self-induction, maintaining this counter electromotive force during the normal action of the translating device, varying this counter electromotive inversely in advance of the changes desired in the counter electromotive force of the translating device while performing its maximum duty, and opposing the initial electromotive force of the source of energy by the combined counter electromotive forces in series while the said translating device is performing its normal work.

12. The method of operating an electric railway having a number of cars, which consists in supplying to a circuit extending along the railway a current of constant potential, operating in parallel across the circuit the motor or motors of the several cars, interposing in parallel in the line-circuits but in series with each of the respective motors independent regulating variable counter electromotive forces whereby the counter electromotive force of the motor and regulating counter electromotive force on each car are employed in series to oppose the electromotive force of the line, and independently varying the regulating counter electromotive force for each car in advance of desired changes of speed and counter electromotive force in its motor or motors to change or regulate the speed without affecting the speed of the motors of the other cars.

In testimony of which invention I hereunto set my hand.

R. M. HUNTER.

Witnesses:
J. W. KENWORTHY,
R. M. KELLY.